(12) United States Patent
Kushwaha et al.

(10) Patent No.: US 8,786,594 B2
(45) Date of Patent: Jul. 22, 2014

(54) METHOD AND SYSTEM FOR RENDERING A MEDICAL IMAGE

(75) Inventors: Rajesh Kushwaha, Bangalore (IN); Vivek Nair, Bangalore (IN); Renganathan Ramamoorthy, Bangalore (IN)

(73) Assignee: Siemens Aktiengesellschaft, Munich (DE)

(*) Notice: Subject to any disclaimer, the term of this patent is extended or adjusted under 35 U.S.C. 154(b) by 542 days.

(21) Appl. No.: 12/457,046

(22) Filed: May 29, 2009

(65) Prior Publication Data
US 2009/0295802 A1 Dec. 3, 2009

Related U.S. Application Data

(60) Provisional application No. 61/057,256, filed on May 30, 2008.

(51) Int. Cl.
*G06T 15/00* (2011.01)
*G06T 17/00* (2006.01)
*G06K 9/00* (2006.01)

(52) U.S. Cl.
USPC ........................... 345/419; 345/424; 382/131

(58) Field of Classification Search
USPC ................................................. 345/419, 424
See application file for complete search history.

(56) References Cited

U.S. PATENT DOCUMENTS

| | | | | |
|---|---|---|---|---|
| 6,226,542 B1* | 5/2001 | Reisfeld | ......................... | 600/407 |
| 7,266,408 B2* | 9/2007 | Bojovic et al. | ................ | 600/512 |
| 7,270,634 B2* | 9/2007 | Scampini et al. | ............. | 600/447 |
| 7,310,551 B1* | 12/2007 | Koh et al. | ..................... | 600/523 |
| 7,957,572 B2* | 6/2011 | Von Berg et al. | ............. | 382/128 |
| 8,427,475 B2* | 4/2013 | Ruijters et al. | ................ | 345/426 |
| 2006/0258947 A1* | 11/2006 | Olson | ........................... | 600/523 |
| 2007/0229500 A1* | 10/2007 | Engel et al. | .................... | 345/422 |

OTHER PUBLICATIONS

Hastreiter, P.; Ertl, T.; , "Integrated registration and visualization of medical image data," Computer Graphics International, 1998. Proceedings , vol., no., pp. 78-85, Jun. 22-26, 1998.*
Richard A. Robb, "Visualization in biomedical computing", Dec. 1999, Paralleel computing, Vo125, pp. 2067-2110.*
Hastreiter, P.; Ertl, T.;, "Integrated registration and visualization of medical image data," Computer Graphics International, 1998. Proceedings, vol., no., pp. 78-85, Jun. 22-26, 1998.*
Ferre et al., A Framework for Fusion Methods and Rendering Techniques of Multimodal Volume Data, John Wiley & Sons, Ltd (2004).*

* cited by examiner

*Primary Examiner* — Xiao Wu
*Assistant Examiner* — Yingchun He
(74) *Attorney, Agent, or Firm* — Harness, Dickey & Pierce, P.L.C.

(57) ABSTRACT

At least one embodiment of the present invention provides a fast method and system for rendering a medical image. At least one embodiment of the method includes providing a 3D voxel dataset of the heart and generating a 3D vector representation of a selected part of the heart. At least one embodiment of the method further involves the blending of the 3D voxel dataset and the 3D vector representation in a common buffer and finally rendering the medical image, wherein the rendering is based on the blended 3D voxel dataset and the 3D vector representation, such that the selected part of the heart is highlighted.

18 Claims, 5 Drawing Sheets

METHOD AND SYSTEM FOR RENDERING A MEDICAL IMAGE

PRIORITY STATEMENT

The present application hereby claims priority under 35 U.S.C. §119(e) on U.S. Provisional patent application No. 61/057,256 filed May 30 2008, the entire contents of which are hereby incorporated herein by reference.

FIELD

At least one embodiment of the present invention generally relates to medical imaging, particularly a method and/or system for rendering a medical image of a heart.

BACKGROUND

Today, the medical imaging community widely accepts Volume Rendering Technique (VRT) as a common way to visualize a volume. The Volume Rendering Technique renders a volume from the 2-dimensional tomography slices. Volume rendering is a technique used to display a 2D projection of a 3D discretely sampled data set. A typical 3D data set is a group of 2D slice images acquired by a Computer Tomography (CT) or Magnetic Resonance Imaging (MRI) scanner. Usually these are acquired in a regular pattern (e.g., one slice every millimeter) and usually have a regular number of image pixels in a regular pattern. An example, is a regular volumetric grid, with each volume element, or voxel represented by a single value that is obtained by sampling the immediate area surrounding the voxel. A voxel is a volume element, representing a value on a regular grid in a three dimensional space. This is analogous to a pixel, which represents 2D image data. Voxels are frequently used in the visualization and analysis of medical and scientific data. The Volume Rendering Technique application generally has imaging and visualization tools, which allow the radiologist or physician to mask/unmask certain regions in the volume.

Generally various rendering techniques render different parts of the heart. Computer Tomography (CT), Magnetic Resonance Imaging (MRI), Positron Emission Tomography (PET) and Single Photon Emission Computed Tomography (SPECT) data could be used for rendering.

Rendering a fused image from plurality of other images from other modalities to the radiologist helps in more deep and precise diagnosis or treatment. Fused three dimensional representation or image of two separate datasets, for example one of Computed Tomography (CT) modality and one of Positron Emission Tomography (PET) modality, do exist. It is more or less an overlaying of one image over the other. The downside of this is that, its response time is very high during interaction and it also suffers from low picture quality.

SUMMARY

At least one embodiment of the present invention provides a fast method and/or system for rendering a medical image.

In at least one embodiment, a method of rendering a medical image is provided, where the method involves providing a 3D voxel dataset of the heart and the step of generating a 3D vector representation of a selected part of the heart. Then the method includes the step of blending the 3D voxel dataset and the 3D vector representation in a common buffer and finally rendering the medical image. The rendering is based on the blended 3D voxel dataset and the 3D vector representation, such that the selected part of the heart is highlighted.

The underlying idea is to render a medical image by generating a 3D vector representation of a selected part of the heart and then blending said 3D vector representation with a separate 3D voxel dataset of the heart in a common buffer. The final rendering results in highlighting the selected part of the heart, so that the visualization becomes useful for the radiologist or the physician for diagnosis or treatment. Processing the 3D vector representation and 3D voxel dataset separately and blending them in a common buffer at a later stage, for example at run time makes the process much faster than the available methods.

In accordance with another aspect of the present invention, a system is proposed for rendering a medical image. The system comprises a device for providing a 3D voxel dataset of the heart and a generating device for generating a 3D vector representation of a selected part of the heart. The system also comprises a blending device for blending the 3D voxel dataset and the 3D vector representation in a common buffer and a rendering device for rendering the medical image. The rendering is based on the blended 3D voxel dataset and the 3D vector representation, such that the selected part of the heart is highlighted.

In accordance with another aspect of the present invention, a computer program product is proposed, which include a computer readable medium having stored thereon computer executable instructions that, when executed on a computer, configure the computer to perform the method of rendering a medical image as explained above.

In a preferred embodiment, the method further comprises the steps of processing said 3D voxel dataset and 3D vector representation at the common buffer, where said common buffer resides in a graphics memory associates with a graphics processor. The graphics related processes become fast and efficient when run using a graphic processor.

In a further preferred embodiment, the selected part is a left ventricle. One of the main reasons of heart ailments like cardiac arrest is the issues associated with this part of the heart.

In an alternative embodiment, the method further comprises the step of using a look up table for mapping intensity values of the 3D vector representation to color values such that the selected part is highlighted. This enables the end user, who generally would be a physician or a radiologist to visually distinguish and understand various aspects of the rendered image, which gets represented in different color shades.

In an alternative embodiment, the method further comprises the step of windowing, such that tissue covering the selected part is made transparent. Windowing is a technique typically used in image visualization, basically for controlling different parameters of the image for getting the required representation. The different voxel values are mapped to a grey or color scale. Windowing changes the mapping, such that certain ranges of voxel values are mapped to become completely transparent. For example, using this the soft tissue surrounding the heart can be made transparent.

In another alternative embodiment, the method further comprise the steps of extracting arteries of the heart from the 3D voxel dataset into another 3D voxel dataset and regrouping the original 3D voxel dataset of the heart with the 3D voxel dataset of the arteries to a modified 3D voxel dataset, such that the arteries are highlighted in addition to the selected part of the heart. The blending step is then performed based on the modified 3D voxel dataset. Extracting the artery information and then using the same for blending at a later stage enables the artery information to be shown distinctly in the rendered medical image resulting in a more realistic representation.

In another alternative embodiment, the 3D voxel dataset is based on one of Computer Tomography and Magnetic Resonance Imaging data. This enables multiple options for obtaining the 3D voxel dataset.

In another alternative embodiment, the 3D vector representation is based on one of Computer Tomography, Magnetic Resonance Imaging, Positron Emission Tomography and Single Photon Emission Computed Tomography data. This enables the generation of the 3D vector representation of the heart or any part of the heart, from data obtained from different modalities. For example, if the data points are available for a particular volume of the heart, then an open standard (e.g. OpenGL) could be used to generate said volume from the available points.

BRIEF DESCRIPTION OF THE DRAWINGS

The present invention is further described hereinafter with reference to illustrated embodiments shown in the accompanying drawings, in which.

DETAILED DESCRIPTION OF INVENTION

Figure 1:
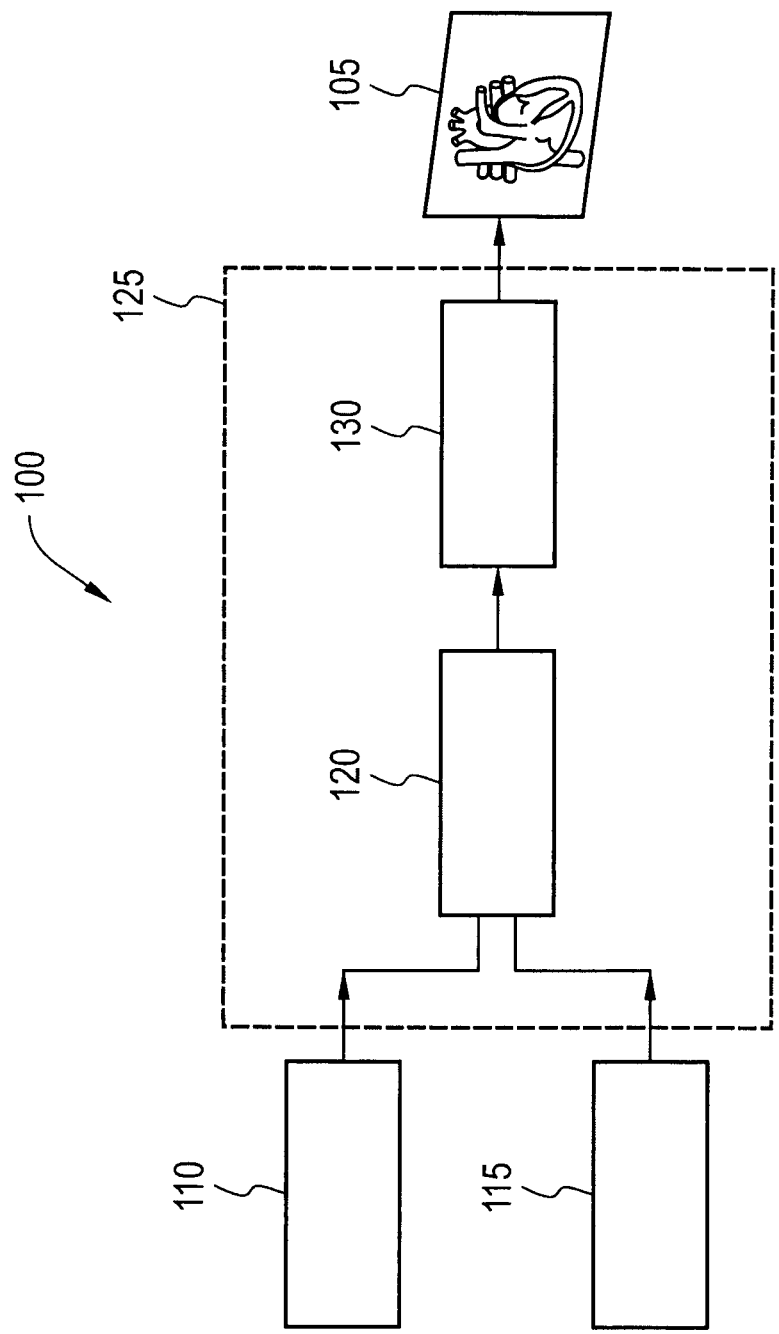
FIG. 1 illustrates a block diagram of a system for rendering a medical image according to an embodiment of the invention.

FIG. 1 illustrates a block diagram of a system 100 for rendering a medical image 105 according to an embodiment of the invention. The system comprises a device 110 for providing a 3D voxel dataset of the heart. The device 110 could be a Computer Tomography or Magnetic Resonance Imaging machine or could even be computer memory storage device from where the 3D voxel dataset is retrieved. Hence the 3D voxel dataset could be based on Computer Tomography or Magnetic Resonance Imaging data. The system 100 further comprises a generating device 115 for generating a 3D vector representation of a selected part of the heart. The selected part of the heart may be the one which the radiologist is interested in, for example the left ventricle.

The left ventricle is one of four chambers (two atria and two ventricles) in the human heart. It receives oxygenated blood from the left atrium via the mitral valve, and pumps it into the aorta via the aortic valve. The left ventricle is longer and more conical in shape than the right, and on transverse section its concavity presents an oval or nearly circular outline. It forms a small part of the sternocostal surface and a considerable part of the diaphragmatic surface of the heart; it also forms the apex of the heart. The left ventricle is thicker and more muscular than the right ventricle because it pumps blood at a higher pressure. By teenage and adult ages, its walls have thickened to three to six times greater than that of the right ventricle. This reflects the typical five times greater pressure workload this chamber performs while accepting blood returning from the pulmonary veins at ~80 mmHg pressure (equivalent to around 11 kPa) and pushing it forward to the typical ~120 mmHg pressure (around 16.3 kPa) in the aorta during each heartbeat. One of the main reasons of heart ailments like cardiac arrest is the issues associated with this part of the heart.

The 3D vector representation could be based on Computer Tomography, Magnetic Resonance Imaging, Positron Emission Tomography or Single Photon Emission Computed Tomography data. Hence a generating device 115, could be a processing device associated with a computer. This 3D vector representation could even be generated from the data supplied by a third party application. A blending device 120 blends the 3D voxel dataset and the 3D vector representation in a common buffer 125. The system 100 also has a rendering device 130 for rendering the medical image 105. Both the blending device 120 and the rendering device 130 could be the same or different processors, which could reside in a graphics card.

The rendered image highlights the region of interest, which is the selected part so that the physicians can get more details just by looking at the image. The highlighting is a way of representing the part in a way that it is clearly distinguished from its surrounding.

Figure 2:
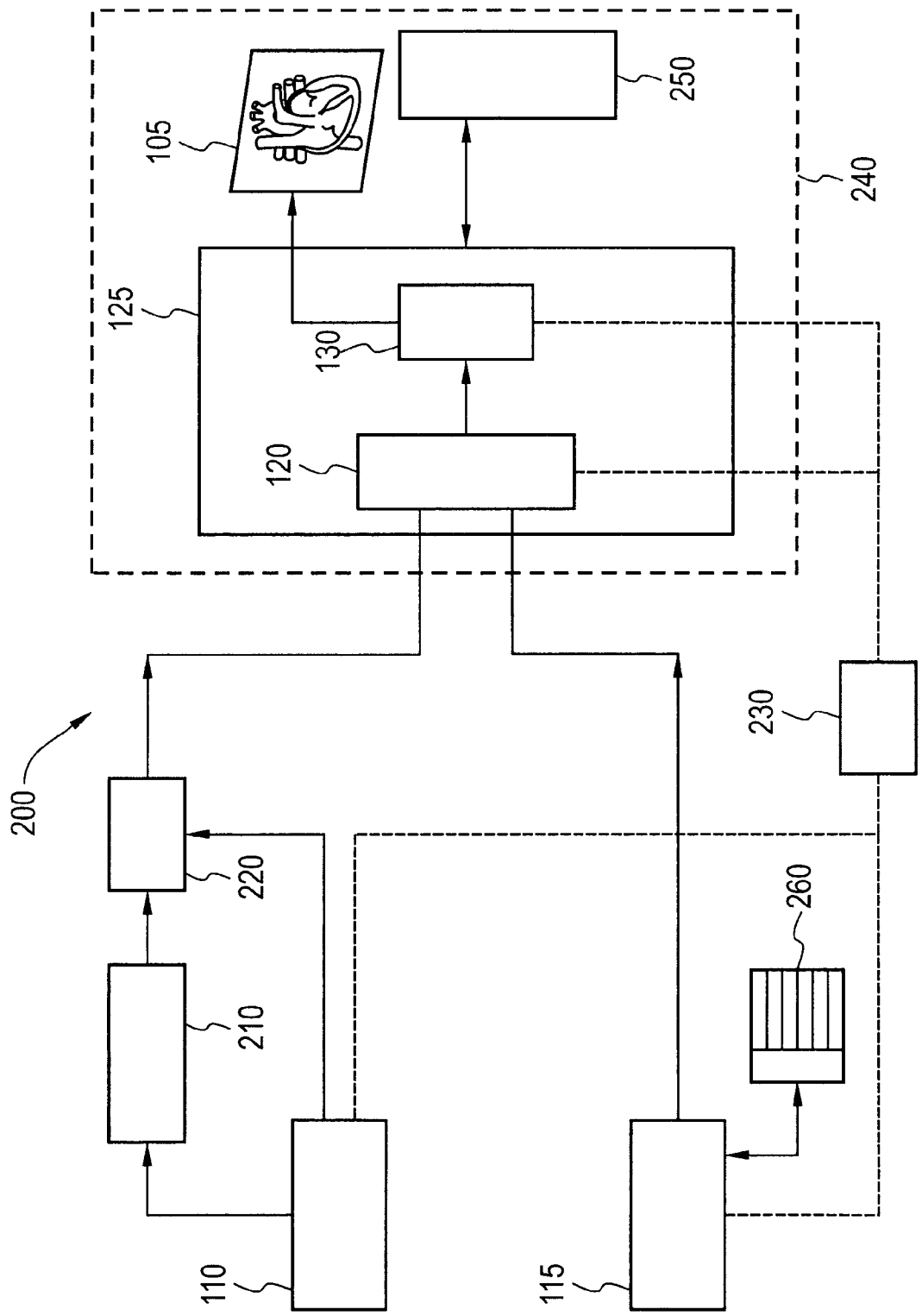
FIG. 2 illustrates a block diagram of a system for rendering a medical image along with additional device(s) for extracting arteries of the heart according to an embodiment of the invention.

FIG. 2 illustrates a block diagram of a system 200 for rendering a medical image 105, along with additional device (s) for extracting arteries of the heart according to an embodiment of the invention. The system further comprises an extracting device 210 for extracting arteries of the heart from the 3D voxel dataset into another 3D voxel dataset. The system also has a regrouping device 220 for regrouping the original 3D voxel dataset of the heart with the new 3D voxel dataset of the arteries to form a modified 3D voxel dataset. The extracting device 210 and the regrouping device 220 could be realized using specific processors or by a single common processor. At the time of regrouping, color information could be added to the arteries. This results in the arteries getting highlighted. The actual blending is performed based on this modified 3D voxel dataset. The system 200 further comprise a look up table 260 associated with the generating device 115 for mapping intensity values of the 3D vector representation to color values such that the selected part is highlighted, for example in different color shades, based on the medical condition.

The muscular walls of the heart consist of three major layers. The bulk of the walls is made up of a layer of cardiac muscle and is called the myocardium. The muscle is enclosed on the outside by the epicardium and on the inside by the endocardium. The heart is also covered completely by a protective sac called the pericardium. Each layer should maintain its appropriate thickness levels to be tagged as healthy. Because of different medical conditions and environment, the thickness levels may reduce or increase from the prescribed healthy threshold levels. As a practical application of the approach, various thickness levels can be mapped to different color information from the look up table 260. This type of visualization helps the radiologist or the physician in fast and accurate diagnosis or treatment. The system 200 further comprises a windowing device 230 for controlling different parameters of an image at different stages for getting the required representation.

Since the blending and rendering processes are done in a common buffer at run time of the associated application, the whole process is very fast. The common buffer 125 could reside in a graphic card 240, which has an associated graphic processor 250.

Figure 3:
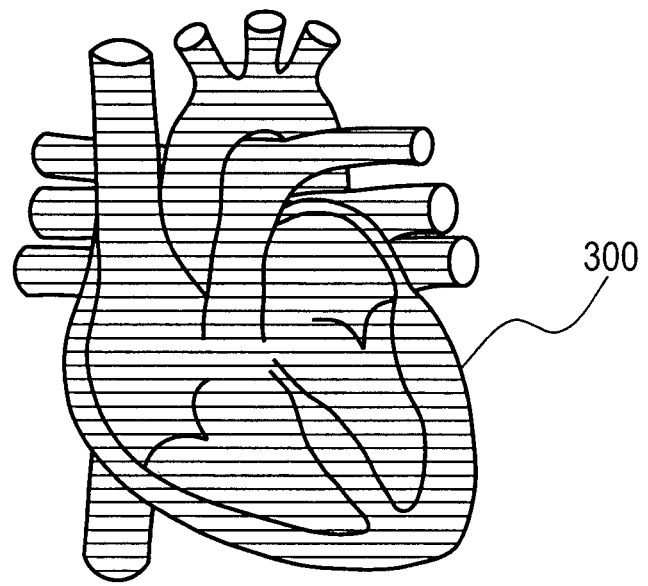
FIG. 3 illustrates a cardiac volume obtained using an imaging modality.

FIG. 3 illustrates a cardiac volume 300. For example, this could be provided by using CT imaging. The image is represented using a 3D voxel based dataset. There are different accepted techniques for the physicians or radiologists to visualize the scanned dataset in three dimensions.

Figure 4:
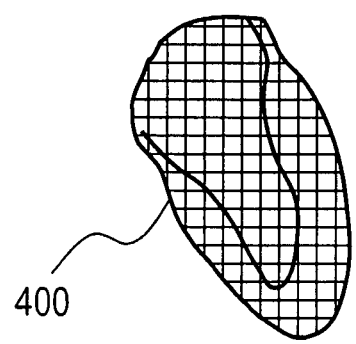
FIG. 4 illustrates a vector representation of left ventricle generated based on associated information according to an embodiment of the invention.

FIG. 4 illustrates a left ventricle 400, generated based on associated information. The left ventricle is represented using a 3D vector representation. Vector graphics is used for this representation. Vector graphics generally uses geometrical primitives such as points, lines, curves, and shapes or polygon (s), which are all based on mathematical expressions, to represent images in computer graphics.

Figure 5:
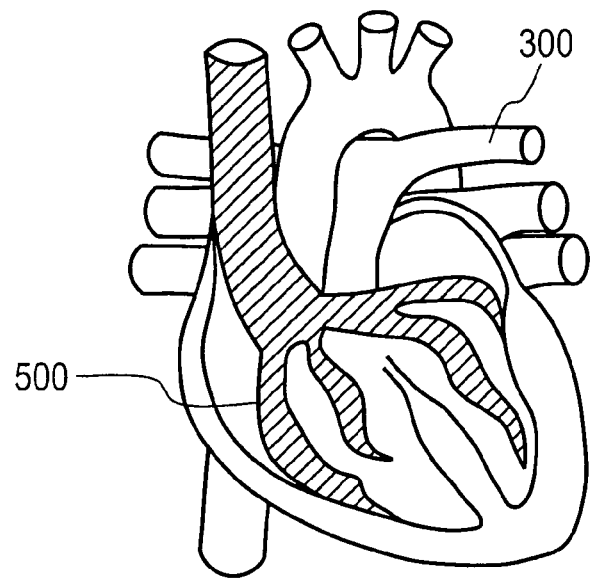
FIG. 5 illustrates coronary artery information alongside the cardiac volume obtained using an imaging modality.

FIG. 5 illustrates coronary artery 500, which is represented on the cardiac volume 300. Coronary circulation is the circulation of blood in the blood vessels of the heart muscle. Although blood fills the chambers of the heart, the muscle tissue of the heart (the myocardium) is so thick that it requires coronary blood vessels to deliver blood deep into it. The vessels that deliver oxygen-rich blood to the myocardium are known as coronary arteries. Blockage of these vessels can be so critical since they are the only source of blood supply to the myocardium. Hence the accurate information on these coronary arteries has got vital importance while diagnosing heart ailments.

Figure 6:
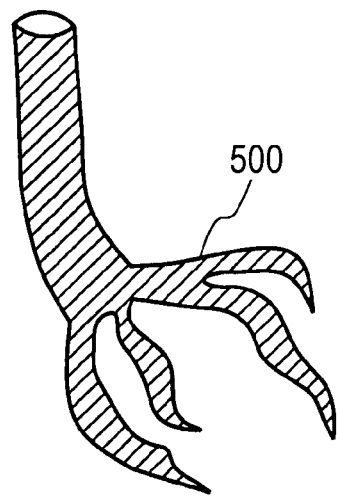
FIG. 6 illustrates coronary artery information which is extracted from a cardiac volume.

FIG. 6 illustrates coronary artery 500, which is extracted from the cardiac volume 300. The extraction device 210 as shown in FIG. 2 is used for extracting the coronary artery 500. Same method could be extended for other blood vessels if required.

Figure 7:
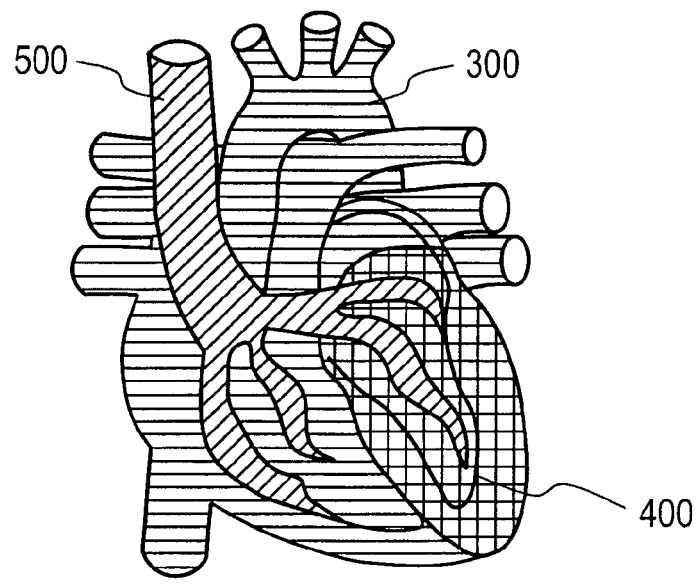
FIG. 7 illustrates a rendered medical image by blending a cardiac volume, left ventricle and coronary artery information.

FIG. 7 illustrates a rendered medical image by blending the cardiac volume 300, left ventricle 400 and the coronary artery information 500. Here all the three sources of information have been combined. A common buffer 125, as shown in FIG. 1 is used to blend this information with a given blending factor and finally render the medical image 105. In the final rendered image, a selected part of the image is highlighted. In the present case the selected part is the left ventricle 400. The final rendered image highlights certain regions of interest in the selected part using different shades based on the health condition of the heart. For example, the rendered image can provide functional information to the user, like information on the left ventricle having a critical medical condition. Also the rendered image could also provide structural information such as, which coronary artery is causing the left ventricle not to function properly.

Figure 8:
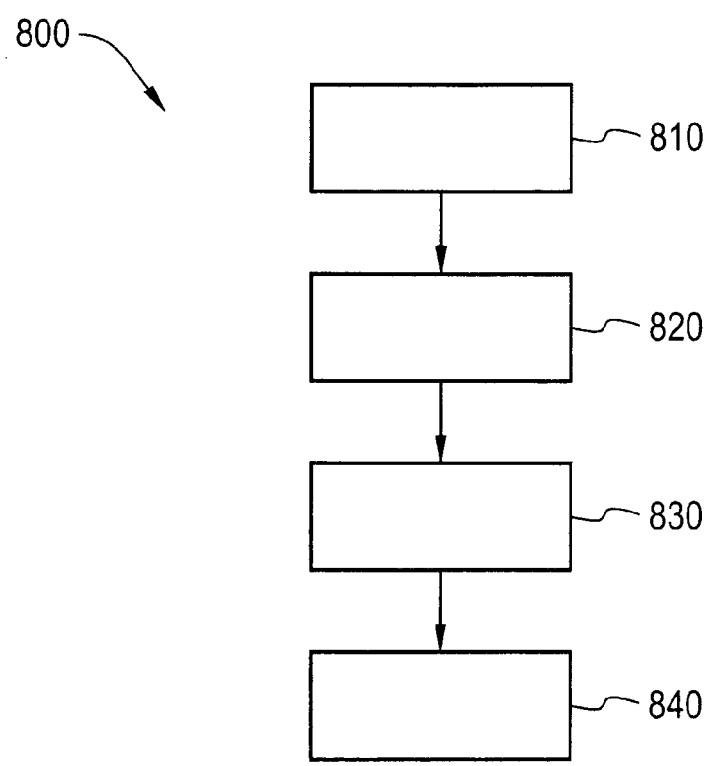
FIG. 8 illustrates flowchart of a method for rendering a medical image according to an embodiment of the invention.

FIG. 8 illustrates flowchart 800 of a method for rendering a medical image. At step 810 a 3D voxel dataset of the heart is provided to the blending device 120. At step 820, a generating device 115 generates a 3D vector representation of a selected part of the heart. At step 830, the blending device 120 blends the 3D voxel dataset and the 3D vector representation in a common buffer. And finally at step 840, the rendering device 130 renders the medical image, such that the selected part of the heart is highlighted.

Summarizing, an embodiment of the present invention introduces a system and method for rendering a medical image by generating a 3D vector representation of a selected part of the heart and then blending the 3D vector representation with a separate 3D voxel dataset of the heart in a common buffer. The final rendering results in highlighting the selected part of the heart. This type of a cardiac visualization is more efficient and fast, when compared to the available techniques currently practiced. This helps in faster and accurate diagnosis and treatment.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims. Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method of rendering a medical image using a processor, comprising:
   providing a 3D voxel dataset of a heart, the 3D voxel dataset being generated from one of a Computer Tomography (CT) data of the heart and a Magnetic Resonance Imaging (MRI) data of the heart such that the 3D voxel data set is a spatial representation of the heart;
   generating, using the processor, a 3D vector representation of a selected part of the 3D voxel dataset of the heart;
   blending, using the processor, the 3D voxel dataset and the 3D vector representation to combine, in a common buffer, portions of the 3D voxel dataset that represent the selected part of the heart with the 3D vector representation replacing the portions of the 3D voxel dataset that represent the selected part of the heart with the 3D vector representation; and
   rendering, using the processor, the medical image, wherein said rendering is based on the blended 3D voxel dataset and the 3D vector representation, such that the selected part of the heart is shown as the 3D vector representation and another portion of the heart is shown as the 3D voxel representation.

2. The method according to claim 1, further comprising processing said 3D voxel dataset and 3D vector representation at the common buffer, where said common buffer resides in a graphics memory associated with a graphics processor.

3. The method according to claim 1, wherein the selected part is a left ventricle.

4. The method according to claim 1, further comprising using a look up table for mapping intensity values of the 3D vector representation to color values such that the selected part is highlighted.

5. The method according to claim 1, further comprising windowing, such that tissue covering the selected part is made transparent.

6. The method according to claim 1, further comprising:
   extracting arteries of the heart from the 3D voxel dataset into another 3D voxel dataset; and regrouping the original 3D voxel dataset of the heart with the 3D voxel dataset of the arteries to a modified 3D voxel dataset, such that the arteries are highlighted, wherein the blending step is performed based on the modified 3D voxel dataset.

7. The method according to claim 1, wherein the 3D vector representation is based on one of Computer Tomography, Magnetic Resonance Imaging, Positron Emission Tomography and Single Photon Emission Computed Tomography data.

8. A system for rendering a medical image, comprising:
   means for providing a 3D voxel dataset of a heart, the 3D voxel dataset being generated from one of a Computer Tomography (CT) data of the heart and a Magnetic Resonance Imaging (MRI) data of the heart such that the 3D voxel data set is a spatial representation of the heart;
   generating means for generating a 3D vector representation of a selected part of the 3D voxel dataset of the heart;
   blending means for blending the 3D voxel dataset and the 3D vector representation to combine, in a common buffer, portions of the 3D voxel dataset that represent the selected part of the heart with the 3D vector representation replacing the portions of the 3D voxel dataset that represent the selected part of the heart with the 3D vector representation; and
   rendering means for rendering the medical image, wherein said rendering is based on the blended 3D voxel dataset and the 3D vector representation, such that the selected part of the heart is shown as the 3D vector representation and another portion of the heart is shown as the 3D voxel representation.

9. The system according to claim 8, wherein the common buffer resides in a graphics memory associated with a graphics processor, which processes said 3D voxel dataset and said 3D vector representation.

10. The system according to claim 8, wherein the selected part is a left ventricle.

11. The system according to claim 8, wherein the system further comprise a look up table for mapping intensity values of the 3D vector representation to color values such that the selected part is highlighted.

12. The system according to claim 8, wherein the system further comprises windowing means, for making tissue covering the selected part transparent.

13. The system according to claim 8, wherein the system further comprises:
   extracting means for extracting arteries of the heart from the 3D voxel dataset into another 3D voxel dataset; and
   regrouping means for regrouping the original 3D voxel dataset of the heart with the 3D voxel dataset of the arteries to a modified 3D voxel dataset, such that the arteries are highlighted, wherein the blending is performed based on the modified 3D voxel dataset.

14. The system according to claim 8, wherein the 3D Vector representation is based on one of Computer Tomography, Magnetic Resonance Imaging, Positron Emission Tomography and Single Photon Emission Computed Tomography data.

15. A non-transitory computer readable medium having stored thereon computer executable instructions that, when executed on a computer device, configures the computer device to perforin a method comprising:
   providing a 3D voxel dataset of a heart, the 3D voxel dataset being generated from one of a Computer Tomography (CT) data of the heart and a Magnetic Resonance Imaging (MRI) data of the heart such that the 3D voxel data set is a spatial representation of the heart;
   generating a 3D vector representation of a selected part of the 3D voxel dataset of the heart;
   blending the 3D voxel dataset and the 3D vector representation to combine, in a common buffer, portions of the 3D voxel dataset that represent the selected part of the heart with the 3D vector representation replacing the portions of the 3D voxel dataset that represent the selected part of the heart with the 3D vector representation; and rendering the medical image, wherein said rendering is based on the blended 3D voxel dataset and the 3D vector representation, such that the selected part of the heart is shown as the 3D vector representation and another portion of the heart is shown as the 3D voxel representation.

16. The computer readable medium according to claim 15, further comprising using a look up table for mapping intensity values of the 3D vector representation to color values such that the selected part is highlighted.

17. The computer readable medium according to claim 15, further comprising windowing, such that tissue covering the selected part is made transparent.

18. The computer readable medium according to claim 15, further comprising:

extracting arteries of the heart from the 3D voxel dataset into another 3D voxel dataset; and regrouping the original 3D voxel dataset of the heart with the 3D voxel dataset of the arteries to a modified 3D voxel dataset, such that the arteries are highlighted, wherein the blending step is performed based on the modified 3D voxel dataset.

* * * * *